(12) United States Patent
Strallhofer et al.

(10) Patent No.: US 11,346,726 B2
(45) Date of Patent: May 31, 2022

(54) SENSOR ELEMENT, SENSOR ARRANGEMENT, AND METHOD FOR MANUFACTURING A SENSOR ELEMENT AND A SENSOR ARRANGEMENT

(71) Applicant: EPCOS AG, Munich (DE)

(72) Inventors: Heinz Strallhofer, Deutschlandsberg (AT); Gerald Kloiber, Feldkirchen (AT); Thomas Stendel, Deutschlandsberg (AT); Jan Ihle, Grambach (AT)

(73) Assignee: EPCOS AG, Munich (DE)

( * ) Notice: Subject to any disclaimer, the term of this patent is extended or adjusted under 35 U.S.C. 154(b) by 229 days.

(21) Appl. No.: 15/329,219

(22) PCT Filed: Jul. 14, 2015

(86) PCT No.: PCT/EP2015/066078
§ 371 (c)(1),
(2) Date: Jan. 25, 2017

(87) PCT Pub. No.: WO2016/012311
PCT Pub. Date: Jan. 28, 2016

(65) Prior Publication Data
US 2017/0219440 A1    Aug. 3, 2017

(30) Foreign Application Priority Data
Jul. 25, 2014    (DE) .................... 102014110560.5

(51) Int. Cl.
*G01K 7/22*    (2006.01)
*G01K 1/12*    (2006.01)

(52) U.S. Cl.
CPC .............. *G01K 7/22* (2013.01); *G01K 1/12* (2013.01)

(58) Field of Classification Search
CPC .......... G01K 7/22; G01K 1/12; H01C 1/1413; H01C 7/008; H01C 1/14; H01C 1/144
(Continued)

(56) References Cited

U.S. PATENT DOCUMENTS 4,712,085 A    12/1987    Miki et al.
4,806,900 A    2/1989    Fujimori et al.
(Continued)

FOREIGN PATENT DOCUMENTS

CN    1367497 A    9/2002
CN    101583858 A    11/2009
(Continued)

OTHER PUBLICATIONS

"Layer." Merriam-Webster.com Dictionary, Merriam-Webster, https://www.merriam-webster.com/dictionary/layer. Accessed Mar. 17, 2021. (Year: 2021).*
(Continued)

*Primary Examiner* — Lisa M Caputo
*Assistant Examiner* — Janice M Soto
(74) *Attorney, Agent, or Firm* — Slater Matsil, LLP

(57) ABSTRACT

A sensor element, a sensor arrangement, and a method for manufacturing a sensor element and a sensor arrangement are disclosed. In an embodiment, a sensor element includes a ceramic main body having at least one electrode arranged at the main body and having at least one contact piece for the electrical contacting of the electrode, wherein the contact piece is fastened to the electrode by welding or bonding.

22 Claims, 4 Drawing Sheets

(58) Field of Classification Search
USPC ............................... 374/208, 185; 338/22 R
See application file for complete search history.

(56) References Cited

U.S. PATENT DOCUMENTS

| | | | | |
|---|---|---|---|---|
| 5,319,664 | A * | 6/1994 | Nishida | H01S 3/032 |
| | | | | 372/55 |
| 5,576,239 | A * | 11/1996 | Hatano | H01L 31/02164 |
| | | | | 438/69 |
| 5,760,466 | A * | 6/1998 | Masuri | H01L 23/49531 |
| | | | | 257/633 |
| 5,804,092 | A * | 9/1998 | Axelson | F23Q 7/22 |
| | | | | 219/270 |
| 5,805,049 | A | 9/1998 | Yamada et al. | |
| 5,886,324 | A | 3/1999 | Shea | |
| 5,955,937 | A | 9/1999 | Groen | |
| 6,014,073 | A * | 1/2000 | Torii | G01K 7/22 |
| | | | | 338/25 |
| 6,081,182 | A * | 6/2000 | Tomozawa | G01K 7/223 |
| | | | | 338/25 |
| 6,462,643 | B1 * | 10/2002 | Fujii | H01C 7/025 |
| | | | | 338/22 R |
| 6,498,561 | B2 | 12/2002 | Lavenuta | |
| 7,193,498 | B2 * | 3/2007 | Kawamoto | G01K 1/14 |
| | | | | 338/22 R |
| 7,772,961 | B2 | 8/2010 | Kinoshita et al. | |
| 8,092,085 | B2 * | 1/2012 | Kawase | G01K 7/223 |
| | | | | 374/183 |
| 8,779,617 | B2 | 7/2014 | Egedal et al. | |
| 9,153,365 | B2 * | 10/2015 | Hori | G01K 7/22 |
| 9,370,109 | B2 | 6/2016 | Kloiber et al. | |
| 2002/0101326 | A1 | 8/2002 | Lavenuta | G01K 7/226 |
| | | | | 338/22 R |
| 2003/0128098 | A1 | 7/2003 | Lavenuta | |
| 2008/0226927 | A1 * | 9/2008 | Kaneda | B32B 18/00 |
| | | | | 428/432 |
| 2009/0316752 | A1 | 12/2009 | Kawase | |
| 2010/0066482 | A1 | 3/2010 | Shiko et al. | |
| 2013/0223479 | A1 * | 8/2013 | Satou | G01K 1/12 |
| | | | | 374/163 |
| 2014/0266567 | A1 * | 9/2014 | Watanabe | G01K 7/22 |
| | | | | 338/22 R |
| 2015/0021077 | A1 * | 1/2015 | Chae | H01G 2/06 |
| | | | | 174/260 |
| 2015/0131244 | A1 * | 5/2015 | Ballandras | G01K 11/265 |
| | | | | 361/760 |
| 2016/0265979 | A1 | 9/2016 | Ihle et al. | |
| 2017/0219440 | A1 | 8/2017 | Strallhofer et al. | |

FOREIGN PATENT DOCUMENTS

| | | | | |
|---|---|---|---|---|
| CN | 101733536 | A | 6/2010 | |
| CN | 102536670 | A | 7/2012 | |
| CN | 203708628 | U | 7/2014 | |
| DE | 10015831 | A1 | 4/2001 | |
| DE | 10158529 | A1 | 8/2002 | |
| DE | 102004010713 | A1 * | 9/2005 | ............. G01K 7/223 |
| DE | 102008036837 | A1 | 2/2010 | |
| DE | 112011101480 | T5 | 5/2013 | |
| DE | 112011102074 | T5 | 6/2013 | |
| EP | 0063455 | B1 | 10/1982 | |
| EP | 1227308 | A1 | 7/2002 | |
| EP | 2159556 | A1 | 3/2010 | |
| GB | 2162686 | A * | 2/1986 | ............. H01C 1/144 |
| JP | H06337229 | A | 12/1994 | |
| JP | H1183641 | A | 3/1999 | |
| JP | 2897837 | B2 | 5/1999 | |
| JP | 2002168702 | A | 6/2002 | |
| JP | 2002305102 | A | 10/2002 | |
| JP | 2009270955 | A | 11/2009 | |
| JP | 2009288023 | A | 12/2009 | |
| JP | 2010073731 | A | 4/2010 | |
| JP | 2005340699 | A | 12/2015 | |
| JP | 6357579 | B2 | 7/2018 | |
| TW | 201319006 | A | 5/2013 | |
| WO | 2010055013 | A1 | 5/2010 | |
| WO | 2014072125 | A2 | 5/2014 | |

OTHER PUBLICATIONS

Buttay, C. et al., "Die attach of Power Devices Using Silver Sintering-Bonding Process Optimization and Characterization," IMAPS, High Temperature Electronics Network (HiTen), Oxford, United Kingdom, downloaded on Sep. 11, 2018 on the Internet: URL: https://hal.archives-ouvertes.fr/hal-00672619/document, Jul. 2011, 8 pages.

Lu, G.Q. et al., "A Lead-Free, Low-Temperature Sintering Die-Attach Technique for High-Performance and High Temperature Packaging," High Density Microsystem Design and Packaging and Component Failure an Analysis, 2004, HDP'04, Proceeding of the Sixth IEEE CPMT Conference, 2004, 5 pages.

Sabbah, W. et al., "Study of die attach technologies for high temperature power electronics: Silver sintering and gold-germanium alloy," Microelectronics Reliability, vol. 53, No. 9, 2013, 5 pages.

Schmitt, W. et al., "Novel Silver Contact Paste Lead Free Solution for Die Attach," Proceedings PCIM Europe, 2010 International Exhibition & Conference for Power Electronics Intelligent Motion Power Quality, May 4-6, 2010, 6 pages.

* cited by examiner

SENSOR ELEMENT, SENSOR ARRANGEMENT, AND METHOD FOR MANUFACTURING A SENSOR ELEMENT AND A SENSOR ARRANGEMENT

This patent application is a national phase filing under section 371 of PCT/EP2015/066078, filed Jul. 14, 2015, which claims the priority of German patent application 10 2014 110 560.5, filed Jul. 25, 2014, each of which is incorporated herein by reference in its entirety.

TECHNICAL FIELD

A sensor element having a ceramic main body is specified. The sensor element may serve in particular for measuring a temperature. For example, the sensor element is an NTC (negative temperature coefficient) sensor element, that is to say a thermistor.

BACKGROUND

The demands on sensor elements, in particular temperature sensors, with regard to long-term durability in aggressive media and usage temperatures necessitate a high level of robustness. At the same time, the sensor element should be inexpensive to produce.

For electrical contacting of the ceramic, metallic electrodes are applied to the main body. Normally, connection wires are soldered onto the metallic electrodes.

SUMMARY OF THE INVENTION

Embodiments of the invention provide an improved sensor element, an improved sensor arrangement and an improved production method for a sensor element.

According to a first aspect of the invention, a sensor element having a ceramic main body is specified. This preferably involves an NTC ceramic. For example, the ceramic has a perovskite structure comprising the elements Y, Ca, Cr, Al, O or a spinel structure comprising the elements Ni, Co, Mn, O. The sensor element is designed in particular for measuring a temperature.

The sensor element has at least one electrode. The electrode is arranged at the main body, in particular on a side face of the main body. It is preferable for two electrodes to be arranged at the main body. For example, a further electrode is arranged on a further side face, in particular on an opposite side face, of the main body. The sensor element is, for example, of cuboidal form. The electrodes are arranged, for example, on a top side and on a bottom side of the main body.

It is preferable for the entire electrode to be of layered form. The electrode may have multiple layers.

The sensor element has at least one contact piece for the electrical contacting of the electrode, which contact piece is fastened to the electrode by welding or bonding. For example, the contact piece is fastened to the electrode by way of a method from the group gap welding, thermode welding or laser welding. In the case of bonding, a method from the group thick-wire bonding or thin-wire bonding may be used. This is dependent in particular on the type of contact piece.

It has been found that, with a connecting technique of said type, the temperature resistance of the sensor element is improved in relation to a soldered connection. The usage temperature of soldered connections is limited by the melting temperature of the solder. Solders with high lead content have a melting temperature of approximately 300° C., and many lead-free solders melt already at temperatures of below 230° C. In the case of frequent fluctuations in temperature load in particular, soldered connections are not adequately reliable. In particular, the contact point, that is to say the connecting point between contact piece and electrode, exhibits improved long-term stability. In the case of solder-free, in particular silver-free, constructions, the migration resistance is also improved.

It is preferable for two contact pieces to be provided, which are each fastened to one of two electrodes of the sensor element. The contact piece is preferably fastened directly to the electrode. Below, one of the contact pieces will be described in detail, wherein the description is applicable equally to the other contact piece.

For example, the contact piece is in the form of a wire. The wire may be of circular-section form or may be flattened at the connecting point. Furthermore, use may be made of a wire with a rectangular cross section or of a flat strip. The contact piece may in this case involve a short wire bridge which serves, for example, for the electrical connection of the sensor element to a connector element. In particular, the contact piece may involve a thin wire which is fastened to the electrode, for example, by thin-wire bonding.

It is, for example, possible for the connector element to be arranged on a support, to be part of a support or to be in the form of a support. For example, the connector element is a conductor track on a circuit board, a conductive support of a probe, or a metallization of a support of said type.

It is also possible for the contact piece to be arranged on a support, to be part of a support or to be in the form of a support. In one embodiment, the contact piece simultaneously forms a support for the sensor element or is an integral constituent part of the support. In this case, the electrode of the sensor element is preferably fastened directly to the support, that is to say without a further, separate contact element. For example, the contact piece is in this case fastened to the electrode by thick-wire bonding.

In one embodiment, the contact piece is in the form of a separate contact element. In particular, the contact piece is not an integral constituent part of a support. The contact piece may be fastened to a support, for example, by welding or bonding.

For example, the contact piece comprises or is composed of one or more temperature-stable metals with low corrosion tendency. In one embodiment, the contact piece comprises a precious metal such as, for example, Pt, Au, Ag or is composed of one or more of said metals. In one embodiment, the contact piece comprises a semi-precious metal such as, for example, Cu or is composed of one or more of said metals. In one embodiment, the contact piece comprises a non-precious metal such as, for example, Fe, Ni or is composed of one or more of said metals. The contact piece may also comprise an alloy.

The contact piece may also comprise sub-regions with different materials. For example, the contact piece has a metallic core and is encased with one or more other metals. The surface of the contact piece may additionally also have a coating, such as, for example, a tin plating, a nickel plating or a silver plating.

In one embodiment, the electrode has at least one layer which is formed by a burnt-in paste. The paste is, for example, applied directly to the ceramic of the main body. The paste may be applied by screen printing. One or more further layers may be arranged on the burnt-in layer. For example, one or more sputtered layers are applied to the burnt-in layer.

A burnt-in electrode is also suitable for high usage temperatures of the sensor element, for example, in the range from 250° C. to 300° C. or higher. Furthermore, a burnt-in electrode is also suitable for further steps of the production process which require a high temperature. For example, the sensor element is equipped with a glass encasement after the attachment of the contact piece.

In one embodiment, the electrode has gold or silver. These materials are particularly suitable for a burnt-in layer.

In one embodiment, the electrode has at least one sputtered layer. The sputtered layer is preferably applied directly to the ceramic of the main body and is thus in direct contact with the ceramic. For example, all layers are applied by sputtering. The electrode is, for example, free from a burnt-in paste.

In the case of a sputtered electrode, one advantage consists in the relatively low thermal load on the sensor element during the production process, in particular owing to the omission of burning-in of a metallization paste at temperatures of, for example, 700° C.-900° C. Furthermore, a sputtering process permits particularly inexpensive production, for example, because process costs for a burning-in electrode, such as, for example, paste application and drying and the subsequent burning-in, are omitted. Furthermore, a sputtering process permits a broader material selection for the electrode. In this way, greater flexibility is also achieved with regard to material and fastening of a contact piece.

The electrode is, for example, a thin-film electrode. For example, the entire electrode has a thickness in the range from 0.3 µm to 30 µm.

In one embodiment, the electrode has at least one layer comprising nickel. The layer may also be composed of nickel.

A nickel-containing layer permits a particularly good mechanical and electrical connection, in particular to the ceramic. For example, low-resistance contact with the ceramic can be realized. Furthermore, a nickel-containing layer permits reliable contacting of the sensor element by way of contact pieces composed of different materials. In this way, a high level of flexibility in terms of usage is realized. For example, an electrode of said type permits a connection of gold-containing, silver-containing, aluminum-containing or copper-containing contact pieces. The material of the contact piece and the material of the electrode, for example, the material of a surface layer, are preferably coordinated with one another. For example, in the case of a gold-containing contact piece, a gold-containing surface layer is used, and in the case of an aluminum-containing contact piece, an aluminum-containing surface layer is used.

The nickel-containing layer is, for example, sputtered. For example, the nickel-containing layer is applied directly to the ceramic of the main body and is thus in direct contact with the ceramic.

In one embodiment, the nickel-containing layer additionally comprises a vanadium fraction. A vanadium fraction may be advantageous for a sputtering process in particular for process technology reasons. For example, vanadium is present with a weight fraction of 7% in the nickel-containing layer. Nickel is present, for example, with a weight fraction of 93%.

The thickness of the nickel-containing layer lies, for example, in the range from 0.3 µm to 10 µm.

In one embodiment, the electrode has multiple layers which are arranged directly one above the other.

For example, the electrode has a lower layer and an upper layer. The lower layer is preferably in direct contact with the ceramic of the main body. The upper layer is, for example, applied directly to the lower layer. For example, both layers are sputtered. Alternatively, at least the lower layer may be burnt in. The electrode may also have more than two layers.

For example, the lower layer comprises or is composed of chromium. A chromium-containing layer may be advantageous in particular as an adhesion promoter with respect to the ceramic.

For example, the upper layer comprises or is composed of nickel. The upper layer may additionally have a fraction of vanadium.

In one embodiment, the electrode additionally has a surface layer. The surface layer is the uppermost layer of the electrode and thus forms a termination of the electrode in an upward direction. That part of the electrode which is situated under the surface layer may also be referred to as an electrode base. This may in particular involve one or more layers.

For example, the surface layer comprises an oxidation-inhibiting metal. In particular, the surface layer comprises at least one material from the group of silver, gold, copper, and aluminum. The surface layer is preferably sputtered.

By way of the surface layer, corrosion of the electrode, in particular corrosion of a layer of the electrode situated under the surface layer, can be prevented. Furthermore, the surface layer can also improve the mechanical load capacity of the electrode.

Alternatively or in addition to this, the surface layer may be advantageous for contacting with the contact piece. In one embodiment, the contact piece is fastened directly to the surface layer. In the case of a bonded connection, it is, for example, the case that a gold wire is fastened to a gold-containing surface layer or to a surface layer composed of gold.

In one embodiment, the contact piece is fastened to a part of the electrode, in particular to a layer, which is partially covered by the surface layer. For example, the surface layer is applied only to a part of the electrode base, such that a part of the electrode base is free from the surface layer. In this case, electrical contacting of the electrode may be realized directly on the electrode base. The surface layer then serves, for example, merely as an oxidation preventer for exposed parts of the electrode base.

For example, the surface layer has a thickness in the range from 0.05 µm to 20 µm. The electrode base, that is to say the rest of the electrode, has, for example, a thickness in the range from 0.3 µm to 10 µm.

In a further aspect of the invention, a sensor arrangement having a sensor element as described above is specified. The sensor arrangement has a support for supporting the main body. The main body is preferably fastened to the support. The support preferably exhibits sufficient inherent stability to hold the main body in a fixed position, in particular even in different orientations of the support, without a change in shape of the support or a change in the position of the main body occurring.

The support may also, in addition to its function of supporting the main body, serve for the electrical connection of the main body. The support may be of electrically conductive form or may have electrically conductive parts. In particular, the main body may be connected in electrically conductive fashion to the support.

The electrode of the sensor element is connected, in particular electrically connected, to the support by way of a welded or bonded connection. The connection may be direct or indirect.

In one embodiment, the electrode of the sensor element is directly electrically connected to the support. In this case, the above-described contact piece may simultaneously function as a support or form part of the support. For example, the electrode is connected to the support by bonding, in particular thick-wire bonding.

In one embodiment, the electrode is indirectly electrically connected to the support. In particular, the contact piece is in the form of a separate contact element and is not an integral constituent part of the support. The electrode is in this case connected to the support by way of the contact element. The contact element is connected to the electrode by way of a welded or bonded connection. For example, the contact element may involve a wire, for example, a wire bridge.

For example, the support is of rod-shaped form. For example, the support has a thick wire or a bar. The support may comprise two support elements. Each support element may be of rod-shaped form, for example, in the form of a thick wire or bar. In another embodiment, the support is in the form of a ceramic support. For example, the ceramic support has metallizations for the electrical connection of the electrode.

In one embodiment, the sensor arrangement is in the form of a probe. The probe is used, for example, for measuring parameters of a flowing medium, in particular a temperature. For example, the probe may be inserted through an opening in the wall of a pipe. The support has, for example, a thick, dimensionally stable wire which is connected to the electrode. The wire is, for example, fastened directly to the electrode by thick-wire bonding. Alternatively, the wire may also be connected to the electrode by way of a wire bridge.

In one embodiment, the support is in the form of a circuit board. In particular, the circuit board may have conductor tracks which are electrically connected to the electrodes of the sensor element. An electrode may be connected to a conductor track by way of a contact piece, for example, a wire bridge, by welding or by bonding. The sensor element may, by way of a further electrode, be mounted onto a conductor track and fastened to the conductor track. For example, the further electrode may be sintered with the conductor track, for example, under pressure at low temperature.

The sensor arrangement may have an encasement which at least partially surrounds the sensor element. The mechanical fastening of the sensor element to the support may also be realized by way of the encasement.

According to a further aspect of the present invention, a method for producing the above-described sensor element and/or the sensor arrangement is specified. A ceramic main body is provided which has at least one electrode which is arranged, for example, on a side surface of the main body. Furthermore, a contact piece is provided and is fastened to the electrode by welding or bonding. During the production of a sensor arrangement, it is furthermore the case that a support is provided for supporting the main body. The contact piece may form an integral constituent part of the support.

The present disclosure describes multiple aspects of an invention. All characteristics disclosed with reference to the sensor element, the sensor arrangement or the method are also correspondingly disclosed with reference to the respective other aspects and vice versa, even if the respective characteristic is not explicitly mentioned in the context of the respective aspect.

BRIEF DESCRIPTION OF THE DRAWINGS

Below, the subjects described here will be discussed in more detail on the basis of schematic exemplary embodiments, which are not true to scale.

In the figures.

DETAILED DESCRIPTION OF ILLUSTRATIVE EMBODIMENTS

It is preferably the case that, in the following figures, the same reference signs refer to functionally or structurally corresponding parts of the various embodiments.

Figure 1:
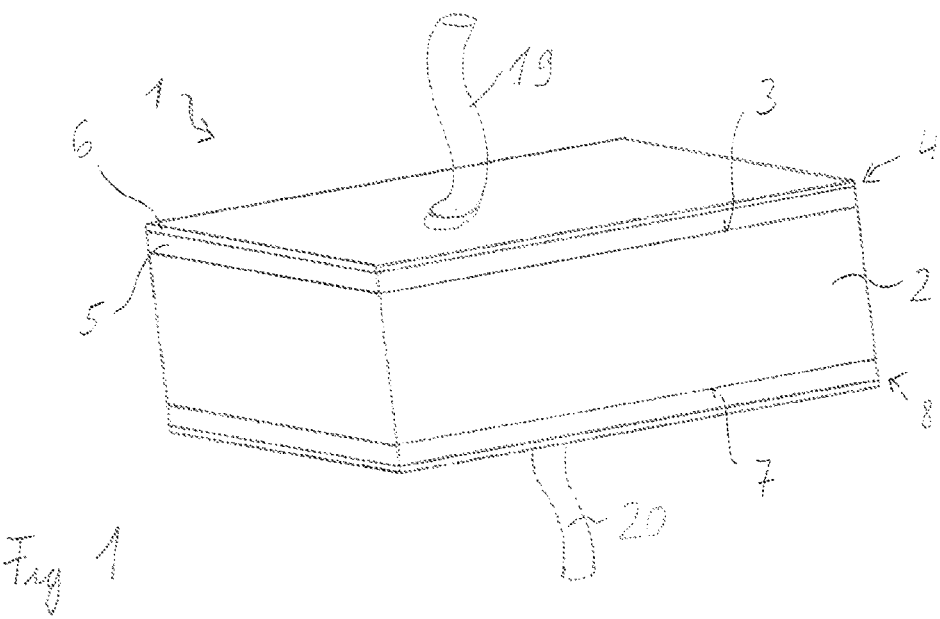
FIG. 1 shows a perspective view of a sensor element.

FIG. 1 shows a sensor element 1, in particular a sensor chip. The sensor element 1 is preferably designed for measuring a temperature. The sensor element has a ceramic main body 2. In particular, the ceramic is an NTC (negative temperature coefficient) ceramic. For example, the ceramic has a perovskite structure. In particular, the ceramic may be based on the system Y—Ca—Cr—Al—(Sn)—O, wherein elements placed between parentheses are optionally provided. A sensor element 1 of said type is suitable in particular for high-temperature applications. Alternatively, the sensor element 1 may, in particular in the case of relatively low usage temperatures, have a ceramic with a spinel structure. For example, the ceramic may be based on the system Ni—Co—Mn—(Al)—(Fe)—(Cu)—(Zn)—(Ca)—(Zr)—(Ti)—(Mg)—O.

The sensor element 1 has an electrode 4 which is arranged on a side face 3 of the main body 2. A further electrode 8 is arranged on a further, oppositely situated side face 7. Below, the construction of one electrode 4 will be described, wherein the description may apply analogously to the further electrode 8.

The electrode 4 is a layered electrode with multiple layers 5, 6. The layers 5, 6 are, for example, sputtered. The electrode 4 is designed such that reliable electrical contacting of the electrode 4 is possible by bonding or by welding.

The electrode 4 has a layer 5 which is also referred to as an electrode base. The layer 5 is applied directly to the ceramic of the main body 2. The layer 5 comprises, for example, nickel with a fraction of vanadium, or is composed of said metals.

A surface layer 6 is applied to the layer 5. For example, the surface layer 6 serves as a corrosion preventer for the electrode base, in particular for preventing oxidation. The surface layer 6 comprises, for example, silver, gold, copper or aluminum, or is composed of one of said materials.

In one embodiment, the electrode base may be of multilayer form. A lower layer of the electrode base is, for example, in direct contact with the ceramic. The lower layer comprises, for example, chromium, or is composed of chromium. The electrode base may furthermore have an upper layer which is applied to the lower layer. The upper layer comprises, for example, nickel with a fraction of vanadium, or is composed of said metals.

For example, all layers 5, 6 of the electrode 4 are applied by sputtering. Alternatively, the electrode base may be formed by burning-in of a metal paste, for example, a gold or silver paste.

Contact pieces 19, 20 are fastened to the electrodes 4, 8 by welding or bonding. The contact pieces 19, 20 are formed as contact elements in the form of short wires. For example, the wires are fastened to the electrodes 4, 8 by bonding.

Those ends of the contact pieces 19, 20 which are still free in this case may be connected to connector elements. For example, the connector elements produce the electrical connection of the sensor element and may at the same time also form a support for the sensor element. The fastening of the contact pieces 10, 20 to the connector elements may likewise be realized by way of welding or bonding. Alternatively, the contact pieces may also be soldered to the connector elements.

In one embodiment, the contact pieces form an integral constituent part of a support. In this case, the contact pieces have sufficient inherent stability to support the main body. For example, the contact pieces are in the form of thick wires.

The contact pieces 19, 20 preferably have temperature-stable metals with a low corrosion tendency. It is, for example, possible for precious metals such as, for example, Pt, Au, Ag or semi-precious metals such as, for example, Cu, and also non-precious metals such as, for example, Fe, Ni, or alloys, to be used. Furthermore, the contact pieces 19, 20 may also be constructed with different regions having different materials. For example, the contact pieces 19, 20 have subregions of different materials. The contact pieces 19, 20 may have a metallic wire core and be encased with one or more other metals. The surface of the contact pieces 19, 20 may additionally also have a coating such as, for example, a tin coating, a nickel coating etc.

Figure 2:
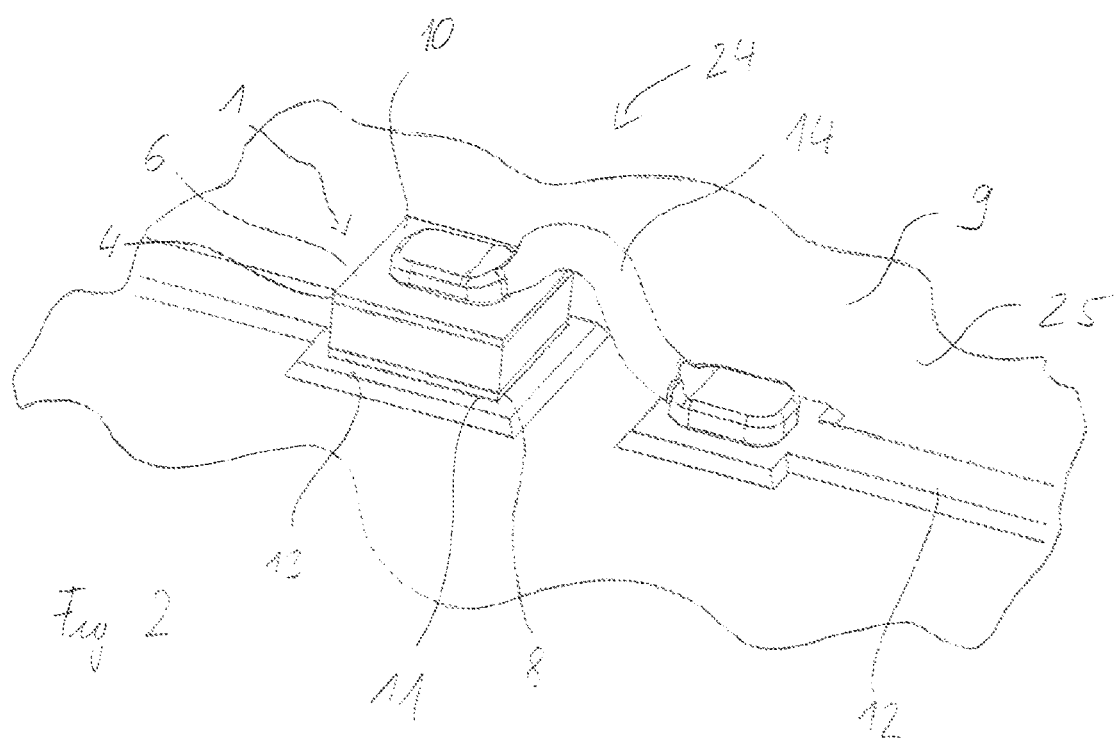
FIG. 2 shows a first embodiment of a sensor arrangement.

FIG. 2 shows a sensor arrangement 24 having a sensor element 1 which is fastened to a circuit board 9. Said construction may be used in particular in the field of power electronics. The main body 2 and the electrodes 4, 8 of the sensor element 1 are designed as in FIG. 1.

The circuit board 9 functions as a support 25 for the main body 2 of the sensor element 1 and for the electrical connection of the electrodes 4, 8. The sensor element 1 has a top side 10 and a bottom side 11. The sensor element 1 is fastened by way of its bottom side 11 to the circuit board 9. The electrode 4 arranged on the top side 10 is electrically connected to a first conductor track 12, and the further electrode 8 arranged on the bottom side 11 is electrically connected to a further conductor track 13 of the circuit board 9.

The sensor element 1 is, for example, soldered by way of its bottom side 11 to the further conductor track 13. For a migration-resistant connection, which is free from silver and free from lead, by way of soldering, a surface layer 6 comprising gold or composed of gold is advantageous. Alternatively, the further electrode 8 is sintered with the further conductor track 13. For this purpose, it is, for example, the case that a fine-particle silver paste is applied to the conductor track 13 and/or to the further electrode 8. Sintering is performed, for example, under pressure at low temperatures. In this case, the surface layer of the further electrode 8 preferably has silver or is composed of silver.

The electrode 4 on the top side 10 is connected by way of a contact piece 14 to the conductor track 12. The contact piece 14 is fastened to the electrode 4 and/or to the circuit board 9, for example, by bonding. In particular, the contact piece 14 is formed by a wire bridge. The wire is flattened at its ends. In particular, the contact piece involves a thin wire, which may be fastened by thin-wire bonding. It is, for example, the case that a gold wire, an aluminum wire or a copper wire is used. The surface layer 6 of the electrode 4 has, for example, gold. The contact piece 14 may, in terms of material and construction, be formed similarly to the contact pieces 19, 20 described in FIG. 1.

Figure 3A:
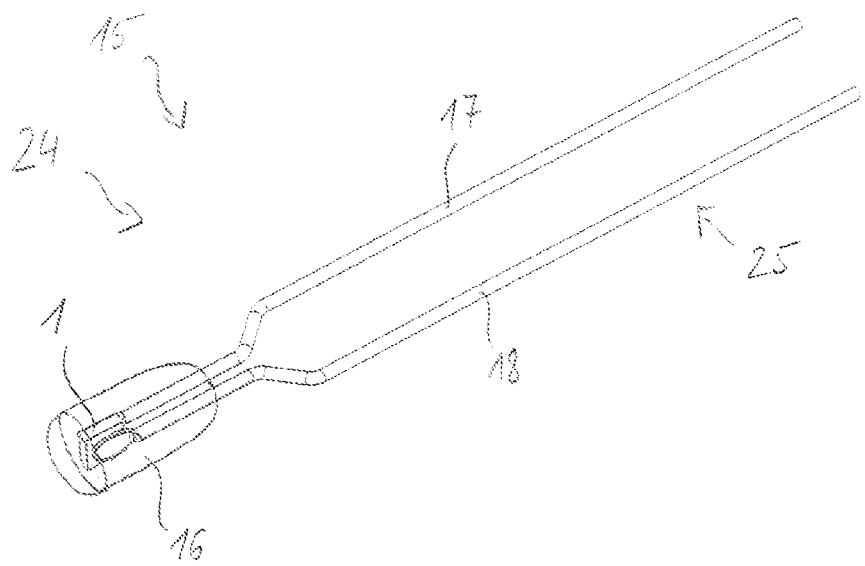
FIG. 3A shows a second embodiment of a sensor arrangement.
Figure 3B:
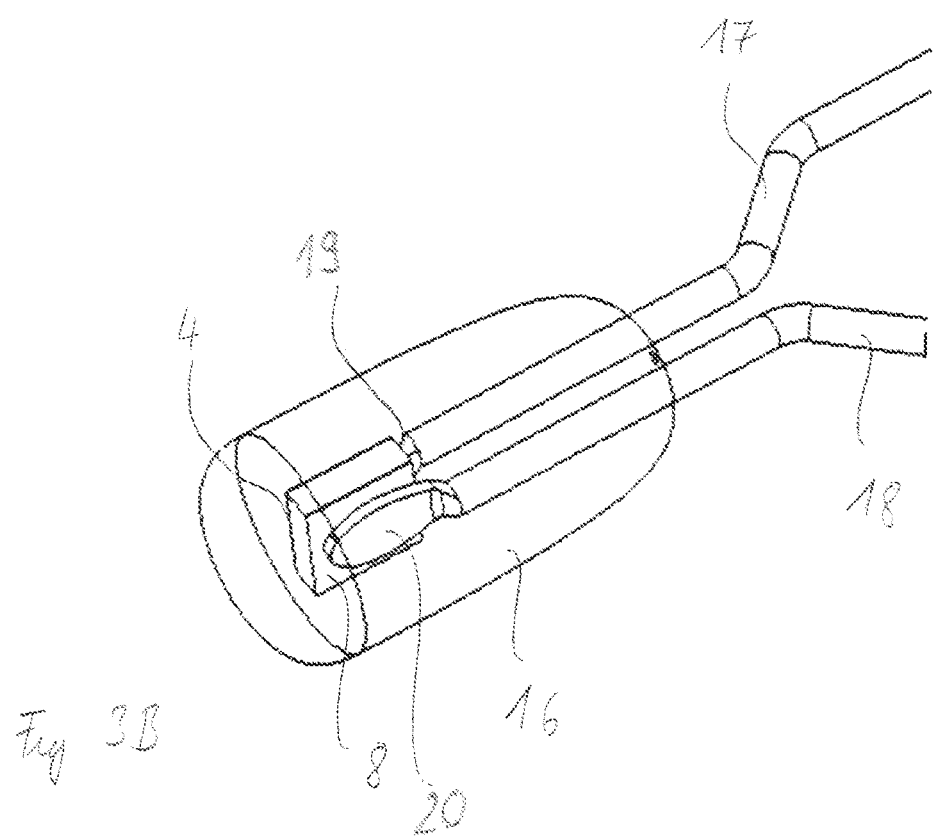
FIG. 3B shows an enlarged detail from FIG. 3A.

FIG. 3A shows a further embodiment of a sensor arrangement 24. FIG. 3B shows an enlarged detail from FIG. 3A. In particular, the sensor arrangement involves a probe 15 having a sensor element 1. The probe 15 is, for example, in the form of a temperature probe. The sensor element 1 is, for example, designed as in FIG. 1.

The probe 15 is of rod-shaped form. The probe 15 is, for example, used for measuring a temperature of a flowing medium. For example, the probe 15 can be inserted through an opening into the wall of a pipe.

The probe 15 has a support 25 comprising two support elements 17, 18. The support elements 17, 18 are, for example, in the form of thick wires which can support the main body 2 of the sensor element 1 and which exhibit adequate dimensional stability. The support elements 17, 18 are in each case of rod-shaped form.

The sensor element 1 is surrounded by an encasement 16. The encasement 16 can ensure adequate mechanical stability of the probe 15. Furthermore, by way of the encasement 16, protection against external influences is possible, and it is, for example, possible for corrosion of the sensor element 1 by aggressive media to be prevented. For example, the encasement 16 has a polymer or glass. The support elements 17, 18 project into the encasement 16. In particular, the contact pieces 19, 20 and thus the contact points between the support elements 17, 18 and the sensor element 1 are surrounded by the encasement 16.

The support elements 17, 18 also serve for the electrical connection of the sensor element 1. In particular, the support elements 17, 18 are electrically conductive. The ends of the support elements 17, 18 are in the form of contact pieces 19, 20 for the direct electrical contacting with the electrodes 4, 8. The contact pieces 19, 20 form an integral part of the support elements 17, 18. The contact pieces 19, 20 of the support elements 17, 18 are, for example welded, or fastened by thick-wire bonding, to the electrodes 4, 8.

It is preferably the case that no solder is used for the connection between the support elements 17, 18 and the electrodes 4, 8. In the case of a welding or bonding process, a migration can be prevented, and the reliability of the sensor element 1 can be increased.

The support elements 17, 18 and in particular the contact pieces 19, 20 may, in terms of material and structure, be designed similarly to the contact pieces 19, 20 described in FIG. 1. However, the contact pieces 19, 20 together with the remaining part of the support elements 17, 18 exhibit sufficient inherent stability to support the sensor element 1.

Figure 4A:
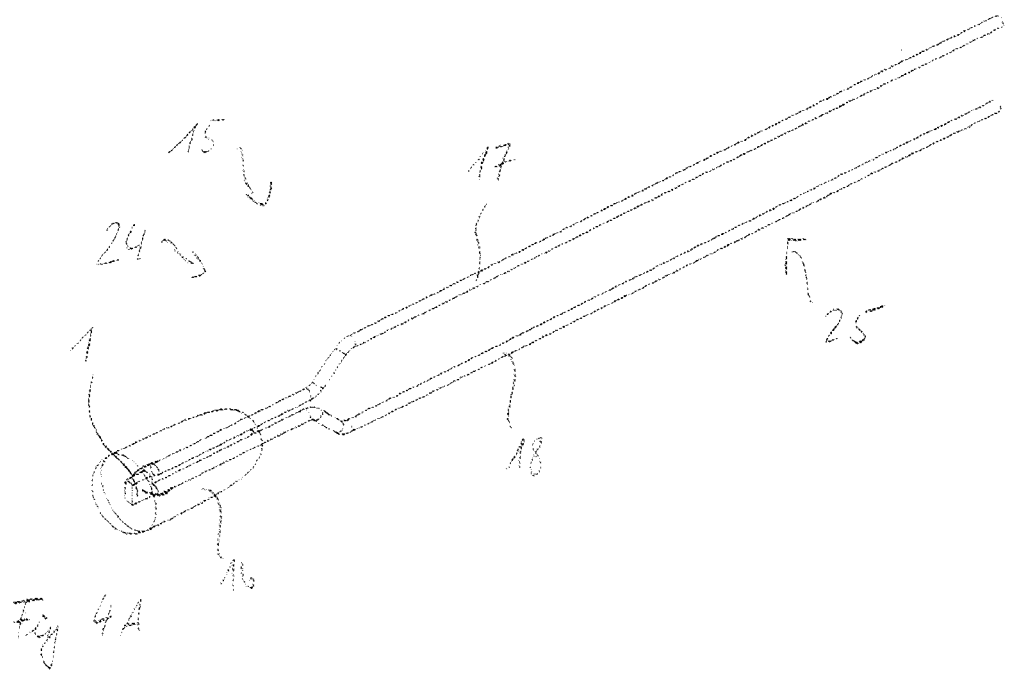
FIG. 4A shows a third embodiment of a sensor arrangement.
Figure 4B:
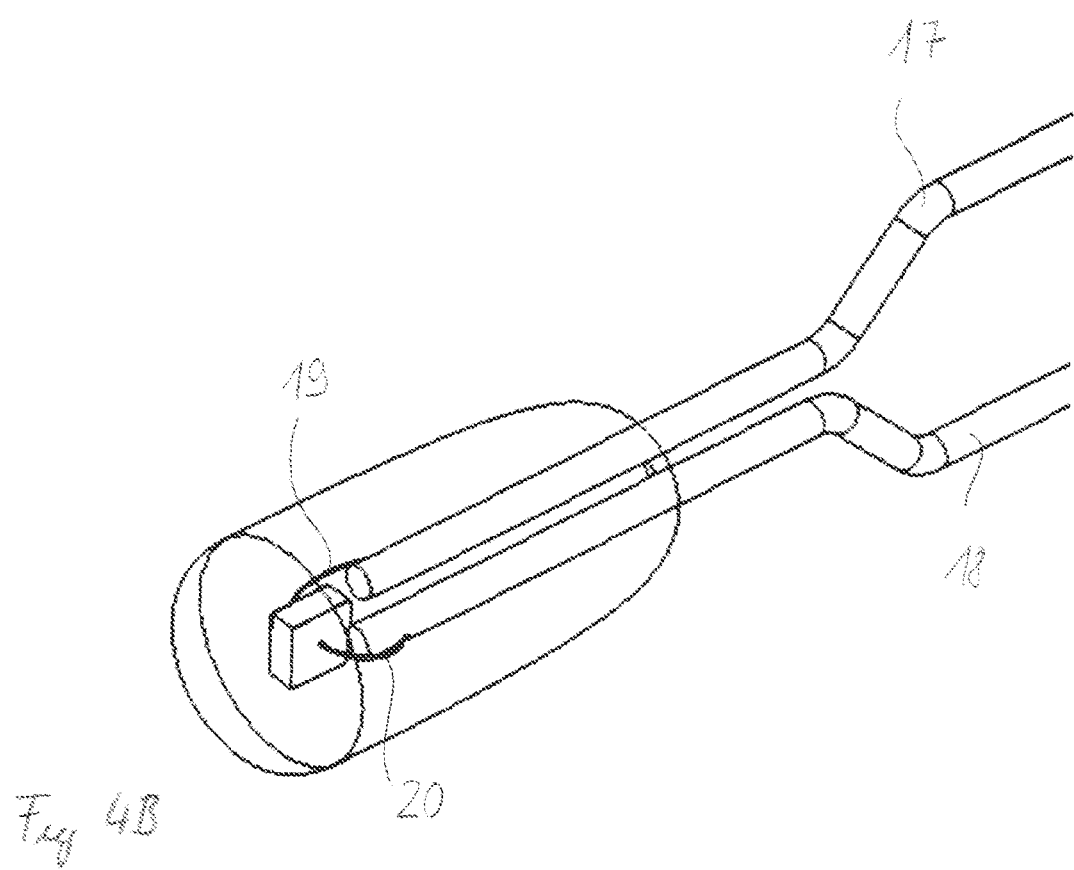
FIG. 4B shows an enlarged detail from FIG. 4A.

FIG. 4A shows a further embodiment of a sensor arrangement 24 in the form of a probe 15. FIG. 4B shows an enlarged detail from FIG. 4A. The sensor arrangement 24 is of similar form to the sensor arrangement 24 from FIG. 3A. However, in the embodiment shown here, the sensor element 1 is not directly fastened to the support elements 17, 18, in particular is not directly electrically connected to the support elements 17, 18. In the present case, the encasement 16 provides the mechanical fastening of the sensor element 1 to the support 25.

Instead, the sensor element 1 is fastened by way of separate contact pieces 19, 20 to the support elements 17, 18. The contact pieces 19, 20 are in the form of wires, in particular bonding wires. The sensor element 1 with the contact pieces 19, 20 may in particular be designed as described in FIG. 1.

Figure 5A:
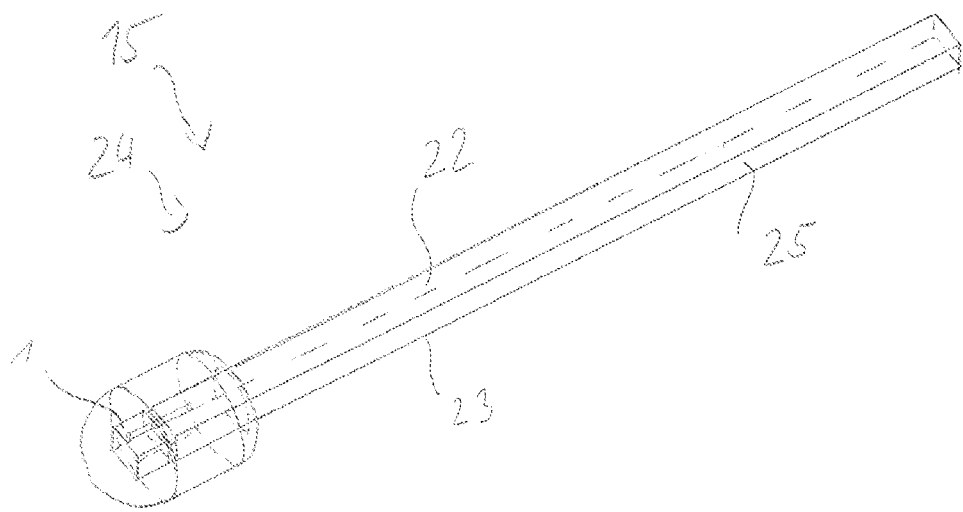
FIG. 5A shows a fourth embodiment of a sensor arrangement.
Figure 5B:
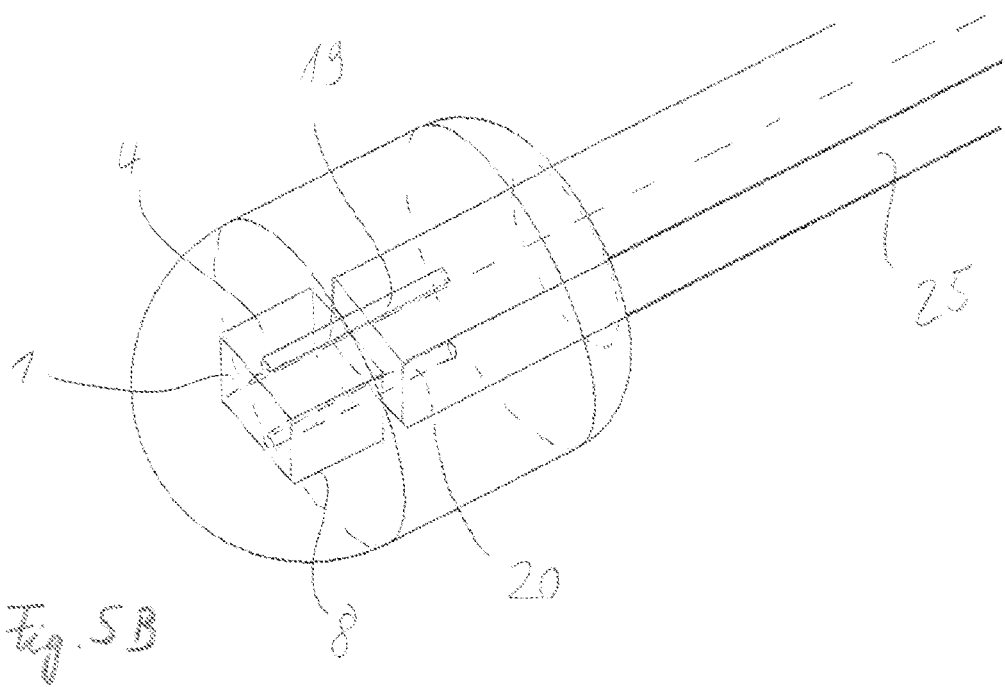
FIG. 5B shows an enlarged detail from FIG. 5A.

FIG. 5A shows a further embodiment of a sensor arrangement 24 in the form of a probe 15 in a semitransparent illustration. FIG. 5B shows an enlarged detail from FIG. 5A. The sensor element 1 is designed as in FIG. 1.

The probe 15 has a support 25 which is provided, on two sides, with metallizations 22, 23. The support 25 has a ceramic. The electrodes 4, 8 of the sensor element 1 are electrically connected to the metallizations 22, 23 by way of in each case one contact piece 19, 20. The contact pieces 19, 20 are fastened to the electrodes 4, 8 of the sensor element 1 by welding or bonding. The contact pieces 19, 20 are fastened to the support 25 likewise by welding or bonding.

The invention claimed is:

1. A sensor element comprising:
a ceramic main body;
at least one electrode arranged directly at the ceramic main body, wherein the electrode comprises an electrode base which directly overlaps with the ceramic main body and which is partially covered by a surface layer; and
at least one contact piece in form of a separate contact element electrical contacting the electrode,
wherein the contact piece is fastened to a part of the electrode base which is free from the surface layer,
wherein the surface layer is an oxidation preventing surface layer for exposed parts of the electrode base,
wherein the surface layer comprises an oxidation inhibiting metal selected from the group consisting of silver, gold, copper and aluminum, and
wherein the surface layer is a sputtered layer and has a thickness in the range of 0.05 µm to 20 µm.

2. The sensor element according to claim 1, wherein the contact piece is fastened by gap welding, thermode welding or laser welding.

3. The sensor element according to claim 1, wherein the contact piece is fastened to the electrode base by thick-wire bonding or thin-wire bonding.

4. The sensor element according to claim 1, wherein the contact piece comprises a metal from the group consisting of Cu, Fe and Ni.

5. The sensor element according to claim 1, wherein the electrode has at least one layer which is formed by a burnt-in paste.

6. The sensor element according to claim 1, wherein the electrode has at least one sputtered layer.

7. The sensor element according to claim 6, wherein the sputtered layer comprises nickel.

8. The sensor element according to claim 1, wherein the electrode base has multiple layers which are arranged directly one above the other.

9. The sensor element according to claim 8, wherein the electrode base has a layer comprising nickel.

10. The sensor element according to claim 9, wherein the contact piece is fastened to a layer which is partially covered by the surface layer.

11. A sensor arrangement comprising:
the sensor element according to claim 1; and
a support for supporting the ceramic main body.

12. The sensor arrangement according to claim 11, wherein the contact piece is a separate wire connecting the sensor element with the support.

13. The sensor arrangement according to claim 11, wherein the contact piece forms an integral constituent part of the support.

14. The sensor arrangement according to claim 11, wherein the support is a circuit board or has at least one thick wire.

15. The sensor arrangement according to claim 11, wherein the support comprises two support elements, wherein the sensor element comprises two electrodes and two contact elements, and wherein each of the contact elements connects one of the electrodes with one of the support elements.

16. The sensor arrangement according to claim 15, wherein the contact elements are thick wires or bars.

17. The sensor arrangement according to claim 11, wherein the support has a rod-shaped form.

18. The sensor arrangement according to claim 11, wherein the support comprises a ceramic having at least one metallization for electrically connecting the electrode.

19. A method for producing the sensor element according to claim 16, the method comprising:
fastening the at least one contact piece to the electrode base, which is partially covered by the surface layer, wherein the electrode base, which is partially covered by the surface layer, is arranged at the ceramic main body.

20. A sensor element, comprising:
a ceramic main body; and
at least one electrode arranged at the ceramic main body, each electrode of the least one electrode comprising an electrode base, which directly overlaps with the ceramic main body and a surface layer, wherein the electrode base a part of the electrode situated under the surface layer, wherein the surface layer covers the entire surface of the electrode base except for a part of the electrode base to which at least one contact piece is fastened;
wherein the at least one contact piece is in the form of a separate contact element and is suited for electrically contacting the electrode;
wherein the surface layer is an oxidation-preventing surface layer for parts of the electrode base which are not covered by the contact element;
wherein the surface layer comprises an oxidation-inhibiting metal selected from the group consisting of silver, gold, copper and aluminium; and
wherein the surface layer is a sputtered layer and has a thickness in the range of 0.05 µm to 20 µm.

21. A sensor element, comprising:
a ceramic main body;
two electrodes are arranged directly at the ceramic main body wherein each electrode comprises an electrode base which directly overlaps with the ceramic main body and which is partially covered by a surface layer; and
at least two contact pieces in the form of a separate contact element for electrically contacting each electrode;
wherein each contact piece is fastened to a part of each electrode base of each electrode, which is free from the surface layer;
wherein the surface layer is an oxidation-preventing surface layer for exposed parts of the electrode base;
wherein the surface layer comprises an oxidation-inhibiting metal selected from the group consisting of silver, gold, copper and aluminium; and
wherein the surface layer is a sputtered layer of substantially constant thickness and has a thickness in the range of 0.05 µm to 20 µm.

22. The sensor element according to claim 21, wherein the surface layer is mainly flat.

* * * * *

UNITED STATES PATENT AND TRADEMARK OFFICE
CERTIFICATE OF CORRECTION

PATENT NO. : 11,346,726 B2
APPLICATION NO. : 15/329219
DATED : May 31, 2022
INVENTOR(S) : Heinz Strallhofer et al.

It is certified that error appears in the above-identified patent and that said Letters Patent is hereby corrected as shown below:

In the Claims

Claim 19, Column 10, Line 15; delete "claim 16" and insert --claim 1--.

Signed and Sealed this
Fifth Day of July, 2022

*Katherine Kelly Vidal*

Katherine Kelly Vidal
*Director of the United States Patent and Trademark Office*